July 21, 1970   A. P. LIMBACH   3,521,491
PLASTIC FLOW ISOLATOR
Filed Sept. 20, 1968
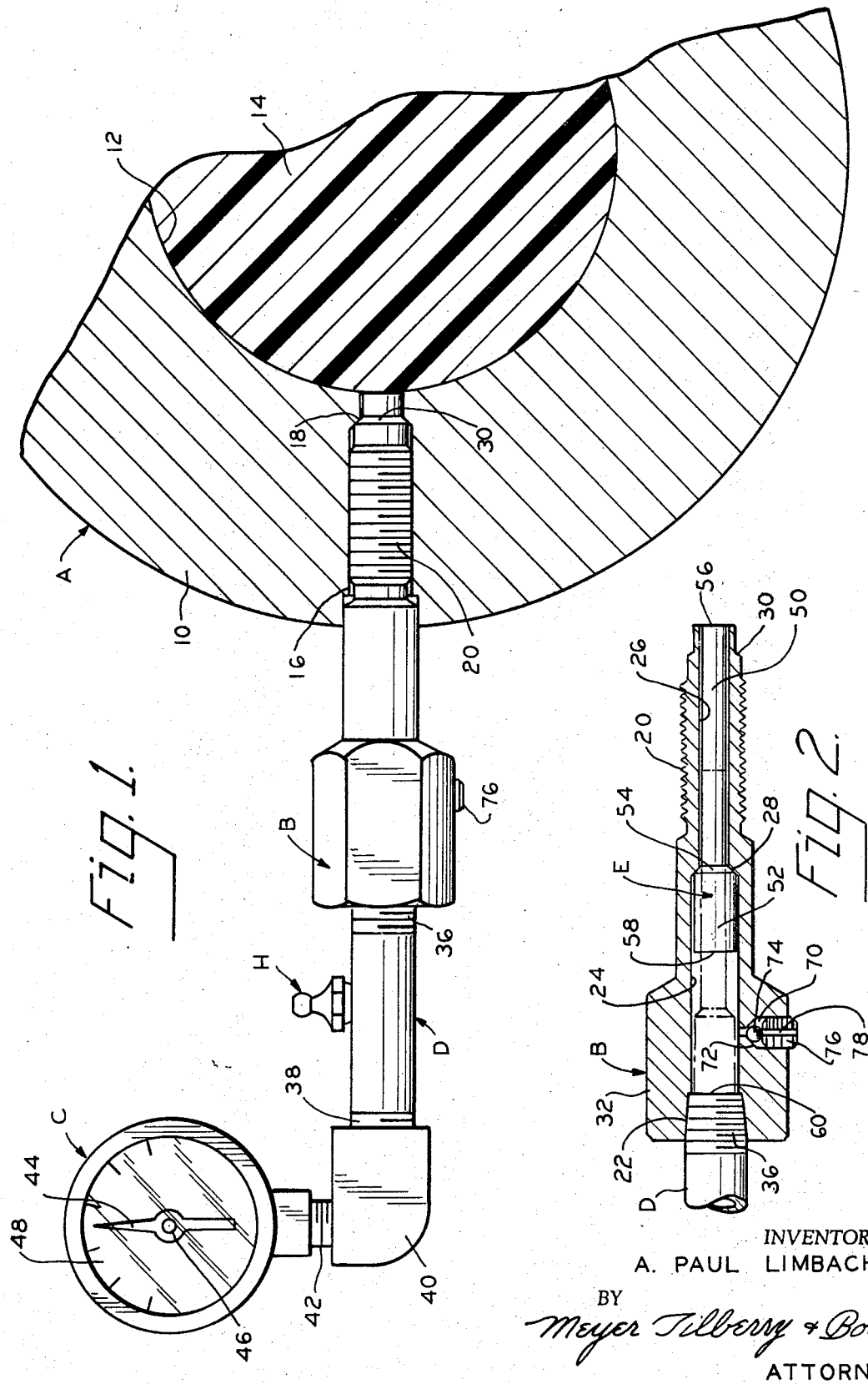
INVENTOR.
A. PAUL LIMBACH
BY
Meyer Tilberry & Body
ATTORNEYS.

United States Patent Office 3,521,491
Patented July 21, 1970

3,521,491
PLASTIC FLOW ISOLATOR
Anthony P. Limbach, Downingtown, Pa., assignor to Process Design, Inc., Downingtown, Pa., a corporation of Delaware
Filed Sept. 20, 1968, Ser. No. 761,159
Int. Cl. G01l 7/16
U.S. Cl. 73—395                       6 Claims

ABSTRACT OF THE DISCLOSURE

An isolator for separating a plastic from the inlet of a pressure gauge includes a tube having a piston therein. The tube is filled with grease on one side of the piston and a melted plastic under pressure contacts the other side of the piston. The piston separates the plastic from the grease. The tube includes a grease inlet and an outlet valve. The tube also has a shoulder which acts as a valve seat in cooperation with a reduced neck portion of the piston.

BACKGROUND OF THE INVENTION

This application pertains to the art of pressure measurement and more particularly to separation of one fluid from another in measuring pressure. The invention is particularly applicable to measuring the pressure of a melted, and flowing thermoplastic material in plastic molding or extrusion machinery. It will be appreciated that the invention has broader applications in separating one fluid from another anywhere that pressures are measured.

The pressure of flowing plastic in a plastic extrusion or molding machine is a controllable variable which may be changed to obtain consistent good quality of the final products. In order to control the pressure it is also necessary to measure it in some manner. An extruder or molding machine has a conduit through which plastic material flows under pressure. It is common to connect one end of a tube, called an adaptor, through the side wall of the conduit so that one end of the tube communicates with the flowing plastic material. The other end of the tube is connected to a grease filled pressure gauge. The flowing plastic enters the tube and acts against the grease to transmit pressure to the gauge. The adaptor is heated only by conduction from the conduit so that material entering the adaptor eventually lines the bore of the adaptor until the bore is severely restricted or even completely closed. This causes an inaccurate and false pressure reading which makes it difficult, if not impossible, to accurately control pressure for optimum quality of the final molded articles. The hot melted plastic also tends to replace the grease in the pressure gauge. Plastic may eventually enter the gauge itself where it solidifies and completely ruins the gauge. Also, some grease may be forced backwards through the adaptor into the conduit through which melted plastic is flowing. Some of this grease may line the walls of the conduit through which the melted plastic is flowing. This modifies the pressure head loss due to friction on the walls of the conduit and completely changes the flow characteristics of the plastic. This makes it extremely difficult to maintain the constant flow characteristics for good quality product and constant adjustments must be made in the machinery. Operation of machinery over a long period of time may bring the temperature of the adaptor up to that of the flowing plastic at its point of connection to the conduit. Flowing plastic which enters this end of the adaptor and replaces grease may degrade when kept at this high temperature over a long period of time. Such degraded plastic and even grease which then enters the flowing stream will cause undesirable discolorations and other defects in the molded articles.

SUMMARY

In accordance with this invention an adaptor is provided for connecting a pressure gauge to a conduit through which melted plastic flows. The adaptor is a hollow tube having two different diameter bores which intersect at a shoulder portion. A piston having large and small diameter portions is received in the hollow tube. The large diameter portion of the piston is connected with the small diameter portion at a reduced neck area which cooperates with the shoulder between the different size bores to form a valve seat. The piston is a very close sliding fit within the bores of the tubes. The small diameter portion of the piston is received in the small diameter bore and extends completely to the end of the adaptor which is attached to the conduit. The large diameter portion of the piston is received in the large diameter bore of the adaptor and is spaced from the end of the adaptor to which the pressure gauge is attached. The space between the pressure gauge and the large diameter portion of the piston is filled with grease. The pressure of flowing plastic in the conduit acts against the end of the small diameter portion of the piston. This force is transmitted through the piston and the end of the large diameter portion of the piston acts against the grease to operate the pressure gauge. The cooperating shoulder in the adaptor and the reduced neck portion of the piston define a valve seat which prevents grease from moving past the large diameter portion of the piston to the small diameter portion. The reduced neck portion will move away from the shoulder portion when pressures are transmitted but the pressure of the grease will be substantially the same as that of the plastic so that the two are kept isolated. Also, the high viscosity of the flowing plastic prevents it from entering the extremely small clearance between the small diameter portion of the piston and the wall of the small diameter bore. The adaptor has a grease fitting communicating with the space between the large diameter portion of the piston and the pressure gauge. Grease may be forced into the space through the grease fitting and acts against the large diameter portion of the piston to move the reduced neck portion into contact with the shoulder portion of the adaptor. This expels any plastic which may have entered the small diameter bore. In this manner, the adaptor can be cleaned of plastic periodically so that pressure readings remain accurate and degraded plastic will not enter the flowing stream to discolor and otherwise ruin the molded articles. The adaptor also has a selective outlet valve between the enlarged diameter portion of the piston and the pressure gauge so that the grease filled area may be returned to atmospheric pressure.

It is a principal object of this invention to provide a special adaptor for isolating a flowing plastic stream from a pressure gauge.

It is another object of this invention to provide such an adaptor with a piston in its bore for separating flowing plastic material from a pressure gauge.

It is a further object of this invention to provide such an adaptor with means for forcing the piston to an extreme position to remove any solidified plastic from the adaptor.

It is another object of this invention to provide such an adaptor with a selective outlet valve for purging air and returning grease in the adaptor to atmospheric pressure.

It is another object of this invention to provide such an adaptor with a shoulder cooperating with a reduced neck on a piston to provide a seal for charging the adaptor with grease.

BRIEF DESCRIPTION OF THE DRAWINGS

The invention may take physical form in certain parts and arrangement of parts, a preferred embodiment of which will be described in detail in the specification and illustrated in the accompanying drawings wherein:

FIG. 1 is a side elevational view showing the adaptor of this invention connected to a pressure gauge and to a conduit through which plastic material flows.

FIG. 2 is a side cross-sectional elevational view of the adaptor of the present invention.

DESCRIPTION OF THE PREFERRED EMBODIMENT

Referring now to the drawings wherein the showings are for the purpose of illustrating a preferred embodiment of the invention only and not for the purpose of limiting same, FIG. 1 shows an extrusion cylinder of conduit A through which hot, melted synthetic plastic material flows in an extrusion or molding machine. An adaptor B is connected at one end to conduit A and at its other end to a pressure gauge C.

Conduit A includes a circular side wall 10 and an elongated circular passageway 12 through which plastic material 14 flows. Plastic material 14 is hot, melted thermoplastic material which may range in temperature from around 275° F. to 700° F., depending on the type of thermoplastic being used. Plastic material 14 flows through passage 12 in conduit A under pressure exerted by a suitable ram or pump means not shown.

Wall 10 of conduit A includes a circular hole 16 extending completely through wall 10 and entering passage 12. Hole 16 extends radially from the longitudinal axes of conduit A and preferably at right angles to such axis. Hole 16 may be formed with a reduced diameter portion where it enters passageway 14 to define a seat 18 for a purpose which will be described later.

An elongated tube defining adaptor B has exterior threads 20 at one end and internal threads 22 at its other end. Adaptor B has a bore completely therethrough axially of its length defined by a large diameter bore portion 24 and a reduced diameter bore portion 26. Large bore 24 intersects small bore 26 at a reduced shoulder portion 28. The end of adaptor B containing exterior threads 20 is formed with a shoulder 30 while its other end is formed into an exterior hexagonal shape 32 as shown in FIG. 1. Hole 16 in conduit A is suitably tapped with threads for cooperation with threads 20 on adaptor B. Adaptor B may be screwed into hole 16 by a wrench cooperating with hexagonal end 32 of adaptor B until shoulder 30 on adaptor B abuts snugly against reduced portion 18 of hole 16 in conduit A. Cooperation between reduced portion 18 of hole 16 and shoulder 30 on adaptor B prevents plastic material 14 from flowing into threads 20 or even past threads 20 and out of hole 16.

In a preferred arrangement, pipe D has exterior threads 36 and 38 on its ends with threads 36 being received in internal threads 22 on adaptor B. Threads 38 connect with a suitable elbow 40 which is connected at its other outlet through pipe 42 to pressure gauge C.

Pressure gauge C may be a conventional Bourdon type gauge including a flattened brass tube closed at one end and bent into an arcuate form. The closed end of the tube is connected by a gear and pinion to a pointer 44 which moves about pivot 46 over scale 48. The open end of the tube is connected through pipe 42, elbow 40 and pipe D to adaptor B. Pressure transmitted through adaptor B, pipe D, elbow 40 and pipe 42 to the flattened brass tube causes the brass tube to straighten slightly just as a bent rubber hose straightens when water is admitted under pressure. The resulting motion of the closed end of the brass tube is then transmitted to pointer 44 in a well-known manner. Adaptor B includes a piston E having a small diameter portion 50 and a large diameter portion 52. Portions 50 and 52 of piston E are cylindrical and intersect at a reduced neck portion 54 which cooperates with shoulder 28 in adaptor B to form a valve seat. Small diameter portion 50 of piston E extends from reduced neck portion 54 throughout the entire length of small diameter bore 26 so that flattened end 56 of small diameter portion 50 is substantially flush with the end of small diameter bore 26. Large diameter portion 52 of piston E extends from reduced neck portion 52 to a flattened end 58 and has a length substantially less than the length of large diameter bore 24. In one arrangement, end 60 of threaded portion 36 on pipe D defines a stop against which end 58 of large diameter portion 52 of piston E strikes to limit axial movement thereof. Total movement of enlarged diameter portion 52 of piston E is limited by stop 60 so that a substantial length of reduced portion 50 always remains in small diameter bore 26 as shown by dotted line position in FIG. 2. Portions 50 and 52 of piston E have an extremely close tolerance within bores 26 and 24 so that plastic material 14 can penetrate very little into the clearance between small diameter portion 50 and the wall of small diameter bore 26, due to its high viscosity. The clearance may be measured in ten thousandths of an inch and is greatly exaggerated in the drawing for clarity in illustrating piston E. The length of clearance space which plastic material 14 could penetrate is very limited due to the high viscosity of plastic material 14 and the close tolerance between reduced diameter portion 50 and the wall of small diameter bore 26. Stop 60 limits movement of piston E to such an extent that sufficient length of reduced diameter portion 50 of piston E remains in small diameter bore 26 to prevent penetration of plastic material 14 into large diameter bore 24.

In a preferred embodiment, a conventional grease fitting H is connected with the wall of pipe D and communicates with the interior thereof. Grease fitting H is of a well-known type including a ball check valve which opens to admit grease under pressure to the interior of pipe D and is spring biased closed when exterior pressure is removed. Adaptor B has a hole 70 formed through the wall thereof radially of the longitudinal axes of adaptor B and communicating with the interior of large diameter bore 24. Hole 70 includes a valve seat 72 which cooperates with ball 74 and set screw 76 to close hole 70 so that fluid cannot pass into or out of large diameter bore 24. Set screw 76 may include one or more longitudinal grooves 78 through which fluid may pass when set screw 76 is screwed outwardly to release ball 74 from its seated position against valve seat 72. In using the device, the parts are assembled as previously described and as shown in FIG. 1. When adaptor B is attached to conduit A the end of small bore portion 26 and end 56 of small diameter portion 50 of piston E are substantially flush with the wall of passage 12 and with the flowing plastic stream 14. Set screw 76 is loosened so that hole 70 communicates large diameter bore 24 with atmosphere. Other fittings may also be loose at this time. A high pressure grease gun has its outlet connected with grease fitting H and grease is supplied to the interior of pipe D, elbow 40, pipe 42, the flattened brass tube within gauge C and large diameter bore 24 of adaptor B. The grease used may be a suitable silicone grease or any other suitable grease which will not volatilize at the temperatures reached due to conduction of heat from conduit A. After all air is purged from the system fittings are tightened and set screw 76 is screwed into place with ball 74 in sealing engagement with seat 72 so that large diameter bore 24 is closed to atmosphere. Grease is again admitted to the system through fitting H until gauge C reads anywhere from 500 to 1,000 p.s.i. This pressure should hold to indicate there are no leaks in the system. If the pressure drops it is an indication of a leak somewhere and all fittings and valves should be examined. If there are no leaks, set screw 76 is loosened to permit communication of large diameter bore 24 with atmosphere through hole 70 until gauge C reads 0. Set screw 76 is then tightened to close off communication of large diameter bore 24 with atmosphere through hole 70. The pressure of the grease will have moved the piston E to the right in FIG. 2 so that reduced neck portion 54 is in sealing engagement with shoulder 28 to prevent entry of grease into small diameter bore 26. Melted plastic material 14 flowing through passage 12 of conduit A under pressure acts against end 56 of small diameter portion 50 of piston E and tends to move piston E to the left in FIG. 2. The pressure of plastic material 14 acting against end 56 is transmitted through piston E to the grease filling large diameter portion 54, pipe D, elbow 40, pipe 42 and the brass tube in gauge C, by flattened end 59 of large diameter portion 52. Pointer 44 then rotates about pivot 46 to give an accurate reading of the pressure in passage 12 on scale 48. The pressure of the grease in large diameter bore 24 will always be substantially the same as the pressure of plastic material 14 acting against end 56 of small diameter portion 50 of piston E. Once piston E moves slightly to the left in FIG. 2, reduced neck portion 54 will move off of shoulder 28. This will allow some grease to penetrate the clearance between small diameter portion 50 of piston E and the wall of small diameter bore 26. The extremely small clearance permits very little contact area between the grease and any plastic material 14 which penetrates the clearance. Since the grease has a much lower viscosity than plastic material 14 is will enter the clearance space much more readily so that it also prevents penetration of plastic 14 into large bore 24. At the same time, the extremely small clearance space between small diameter portion of piston E and the wall of small diameter bore 26 affords very little contact between the grease and plastic material 14.

This extremely small area of possible contact between the grease and plastic material 14 substantially eliminates penetration of the grease into passage 12 where it may change the flow characteristics of plastic 14. Also, plastic material 14 is kept within small diameter bore 26 which is in wall 10 of conduit A and very hot through heat conduction so that plastic material 14 cannot harden. Plastic material which does enter bore 26 may either tend to harden or degrade. Such material may be easily removed by applying grease under high pressure through grease fitting H to move piston E to its extreme right position as previously described. Flattened end 56 of small diameter portion 50 will expel any material clinging to the interior wall of small bore 26. If a substantial amount of grease is lost over a long period of time and recharging is forgotten, large diameter portion 52 of piston E can move only as far as stop 60. An operator will then know that something is wrong because gauge C will not be indicating properly. With large diameter portion 52 contacting stop 60 the length of engagement between small diameter portion 50 and the walls of small diameter bore 26 is still long enough so that plastic material 14 cannot penetrate a sufficient distance to enter large diameter bore 24 due to the high viscosity of the plastic material.

While a preferred embodiment has been illustrated and described it will be apparent to those skilled in the art that obvious minor modifications and rearrangements could be made.

Having thus described my invention, I claim:

1. A device for transmitting pressure from one fluid to another while maintaining separation of the fluids comprising: a hollow tube of unitary construction having two ends and a bore therethrough and including a first means for connecting one end of the tube to one source of fluid and a second means for connecting the other end to a second source of fluid; said bore including a first portion at one end portion of said tube having a first diameter and a second portion at the other end portion of said tube having a second diameter; said second diameter being larger than said first diameter; said second portion of said bore intersecting said first portion of said bore at a reduced shoulder portion defining a seat for a piston; and a piston in said bore; said piston including a small diameter portion received in said first portion of said bore and a large diameter portion received in said second portion of said bore, said large diameter portion intersecting said small diameter portion at a neck portion, said neck portion being cooperative with said shoulder portion to close off said first portion of said bore from said second portion.

2. The device of claim 1 wherein the length of said small diameter portion of said piston is substantially the same as the length of said first portion of said bore.

3. The device of claim 2 wherein said second means includes a means attached to said tube at said second portion of said bore, said stop means cooperating with said large diameter portion of said piston to limit movement of said piston in said bore, the distance between said stop means and said large diameter portion of said piston being less than the length of said small diameter portion of said piston.

4. The device of claim 3 wherein said stop means comprises the inlet of a pressure gauge.

5. The device of claim 4 wherein said inlet defines a first structure and said tube defines a second structure, and a grease fitting on one of said first and second structures for filling said inlet and said second portion of said bore with grease.

6. The device of claim 5 and further including a hole laterally through said tube entering said second portion of said bore, and selectively operable valve means in said hole for opening and closing said second portion of said bore to atmosphere.

References Cited

UNITED STATES PATENTS

| | | | |
|---|---|---|---|
| 2,481,651 | 9/1949 | Fitzpatrick | 73—395 |
| 2,748,602 | 6/1956 | Weber | 73—395 |
| 3,415,123 | 12/1968 | Broughton | 73—395 |

DONALD O. WOODIEL, Primary Examiner

U.S. Cl. X.R.

73—419, 420